United States Patent
Ren et al.

(10) Patent No.: US 11,621,631 B2
(45) Date of Patent: Apr. 4, 2023

(54) POWER FACTOR CORRECTION CONVERTER AND CONTROL METHOD THEREOF

(71) Applicant: Delta Electronics (Shanghai) Co., Ltd., Shanghai (CN)

(72) Inventors: Liangliang Ren, Shanghai (CN); Baohua Wang, Shanghai (CN)

(73) Assignee: DELTA ELECTRONICS (SHANGHAI) CO., LTD., Shanghai (CN)

( * ) Notice: Subject to any disclaimer, the term of this patent is extended or adjusted under 35 U.S.C. 154(b) by 92 days.

(21) Appl. No.: 17/458,104

(22) Filed: Aug. 26, 2021

(65) Prior Publication Data
US 2022/0200445 A1 Jun. 23, 2022

(30) Foreign Application Priority Data
Dec. 23, 2020 (CN) .......................... 202011541037.7

(51) Int. Cl.
*H02M 1/42* (2007.01)
*H02M 1/08* (2006.01)

(52) U.S. Cl.
CPC ......... *H02M 1/4233* (2013.01); *H02M 1/083* (2013.01); *H02M 1/4241* (2013.01); *H02M 1/4258* (2013.01); *H02M 1/4266* (2013.01)

(58) Field of Classification Search
CPC ... G05F 1/563; H02M 1/4233; H02M 1/4241; H02M 1/4258; H02M 1/4266
See application file for complete search history.

(56) References Cited

U.S. PATENT DOCUMENTS

| | | | | |
|---|---|---|---|---|
| 10,381,915 | B1* | 8/2019 | Dusmez | H02M 7/217 |
| 2012/0262954 | A1* | 10/2012 | Duvnjak | H02M 1/4258 |
| | | | | 363/21.02 |
| 2012/0293141 | A1* | 11/2012 | Zhang | H02M 1/4233 |
| | | | | 323/207 |
| 2013/0257390 | A1* | 10/2013 | Jin | H02M 1/4233 |
| | | | | 323/205 |

(Continued)

FOREIGN PATENT DOCUMENTS

| | | |
|---|---|---|
| CN | 103151912 A | 6/2013 |
| CN | 106787859 A | 5/2017 |

(Continued)

*Primary Examiner* — Gary A Nash
(74) *Attorney, Agent, or Firm* — Kirton McConkie; Evan R. Witt (57) ABSTRACT

A PFC converter and a control method thereof are provided. The PFC converter includes a first bridge, an inductor, a second bridge and a control unit. The first bridge includes a first switch and a second switch connected in series. There is a first node between the first and second switches. Two terminals of the inductor are coupled to the first node and a first terminal of an AC power source respectively. The second bridge includes a third switch and a fourth switch connected in series. There is a second node between the third and fourth switches, and the second node is coupled to a second terminal of the AC power source. The control unit controls a ratio of a high level duration on the second node in every line frequency cycle to be smaller than $(250/Vbus)^2$, where Vbus is an output voltage of the PFC converter.

19 Claims, 10 Drawing Sheets

(56) References Cited

U.S. PATENT DOCUMENTS

| | | | |
|---|---|---|---|
| 2015/0263605 A1* | 9/2015 | Alam | H02M 3/33546 363/21.02 |
| 2016/0134185 A1* | 5/2016 | Wang | G01R 19/175 324/127 |
| 2017/0033681 A1* | 2/2017 | Wen | H02M 1/42 |
| 2017/0070157 A1* | 3/2017 | Tsukii | H02M 1/4233 |
| 2017/0366099 A1* | 12/2017 | Li | H02M 3/285 |
| 2018/0062504 A1* | 3/2018 | Mei | G05F 1/70 |
| 2018/0152095 A1* | 5/2018 | Bai | H02M 3/3376 |
| 2019/0319528 A1* | 10/2019 | Matsuura | H02M 7/217 |
| 2019/0348833 A1* | 11/2019 | Sun | H02M 1/4233 |

FOREIGN PATENT DOCUMENTS

| | | |
|---|---|---|
| CN | 108075634 A | 5/2018 |
| CN | 108649787 A | 10/2018 |
| CN | 110289776 A | 9/2019 |
| CN | 111668840 A | 9/2020 |
| CN | 112117888 A | 12/2020 |
| TW | 201720038 A | 6/2017 |
| TW | 201810889 A | 3/2018 |
| TW | 202013874 A | 4/2020 |
| WO | 2020159640 A1 | 8/2020 |

\* cited by examiner

POWER FACTOR CORRECTION CONVERTER AND CONTROL METHOD THEREOF

CROSS-REFERENCE TO RELATED APPLICATION

This application claims priority to China Patent Application No. 202011541037.7, filed on Dec. 23, 2020. The entire contents of the above-mentioned patent applications are incorporated herein by reference for all purposes.

FIELD OF THE INVENTION

The present disclosure relates to a PFC (power factor correction) converter and a control method thereof, and more particularly to a totem pole PFC converter and a control method thereof.

BACKGROUND OF THE INVENTION

In the conventional boost PFC converter, it is difficult to increase the power density due to the large loss of the diodes of the rectification bridge. With the development of the power components, the totem pole PFC converter has been widely used. There is no rectification bridge in the totem pole PFC converter, and thus the totem pole PFC converter achieves better efficiency.

However, compared with the boost PFC converter, the working voltage between the primary and secondary grounds of the post-stage isolated converter connected to the totem pole PFC converter is higher. The distance between the primary and secondary grounds of converter is determined by the working voltage between the primary and secondary grounds. Accordingly, the higher working voltage between the primary and secondary grounds causes the longer safety creepage or clearance distance between the primary and secondary grounds of the post-stage isolated converter connected to the totem pole PFC converter. Consequently, the volume of the optoelectronic isolator between the primary and secondary grounds needs to be larger, which also increases the cost.

Therefore, there is a need of providing a PFC converter and a control method thereof to obviate the drawbacks encountered from the prior arts.

SUMMARY OF THE INVENTION

It is an objective of the present disclosure to provide a PFC converter and a control method thereof. On the middle node of the line frequency bridge, a ratio of the high level duration in every line frequency cycle is controlled to be smaller than a threshold value, thereby decreasing the working voltage between primary and secondary grounds of the post-stage converter connected to the PFC converter. Accordingly, the distance between the primary and secondary grounds of the post-stage converter is reduced. Consequently, the volume of the optoelectronic isolator between the primary and secondary grounds can be reduced, which also decreases the cost.

In accordance with an aspect of the present disclosure, there is provided a PFC converter. The PFC converter includes a first bridge, an inductor, a second bridge and a control unit. The first bridge includes a first switch and a second switch connected to each other in series. There is a first node between the first and second switches. Two terminals of the inductor are coupled to the first node and a first terminal of an AC power source respectively. The second bridge includes a third switch and a fourth switch connected to each other in series. There is a second node between the third and fourth switches, and the second node is coupled to a second terminal of the AC power source. The control unit is configured to control a ratio of a high level duration on the second node in every line frequency cycle to be smaller than a threshold value equal to $(250/Vbus)^2$, where Vbus is an output voltage of the PFC converter.

In accordance with another aspect of the present disclosure, there is provided a control method of a PFC converter. The PFC converter includes a first bridge, a second bridge and an inductor. The first bridge includes a first switch and a second switch connected to each other in series. There is a first node between the first and second switches. Two terminals of the inductor are coupled to the first node and a first terminal of an AC power source respectively. The second bridge includes a third switch and a fourth switch connected to each other in series. There is a second node between the third and fourth switches, and the second node is coupled to a second terminal of the AC power source. The control method includes controlling a ratio of a high level duration on the second node in every line frequency cycle to be smaller than a threshold value equal to $(250/Vbus)^2$, where Vbus is an output voltage of the PFC converter.

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1A:
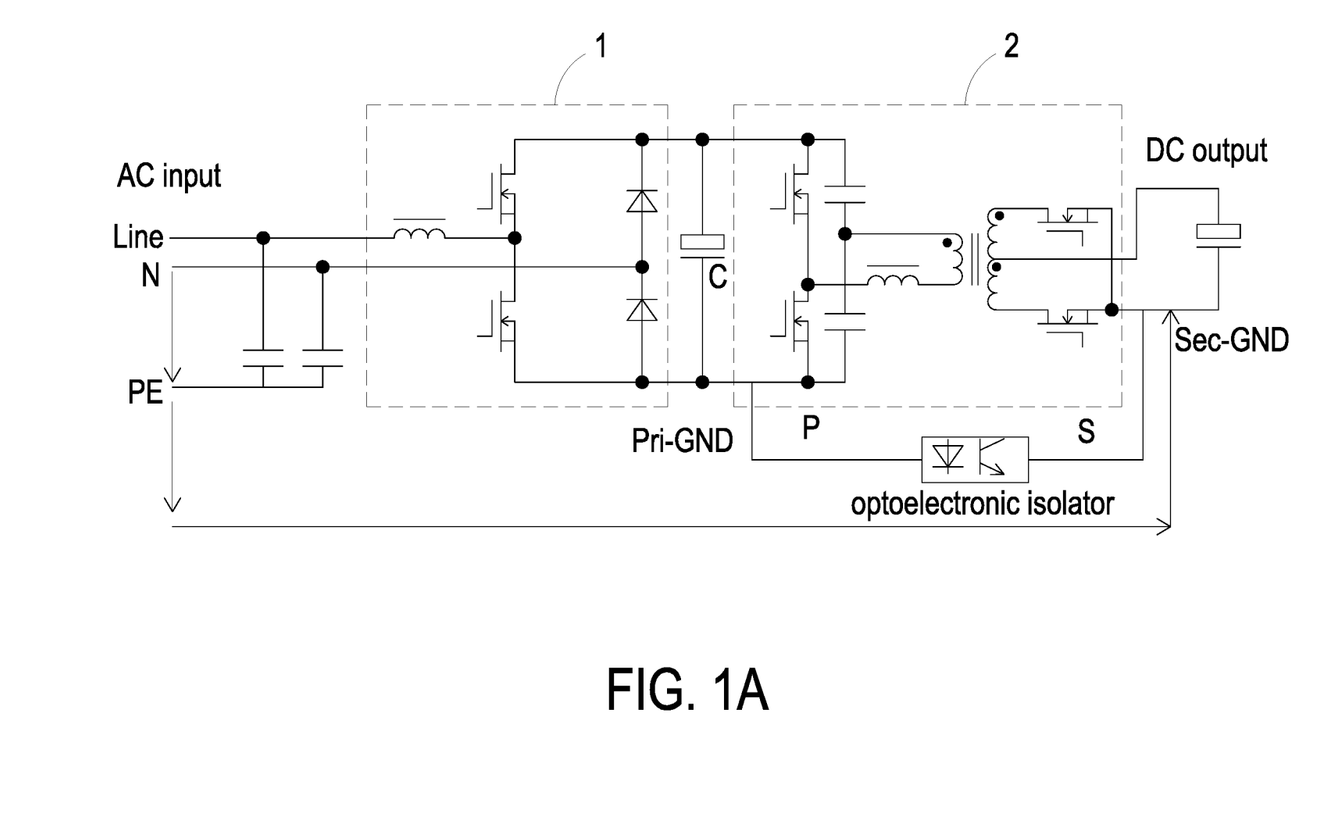
FIG. 1A is a schematic diagram showing a manner of measuring a working voltage between the primary and secondary grounds of a post-stage isolated converter connected to a PFC converter.
Figure 1B:
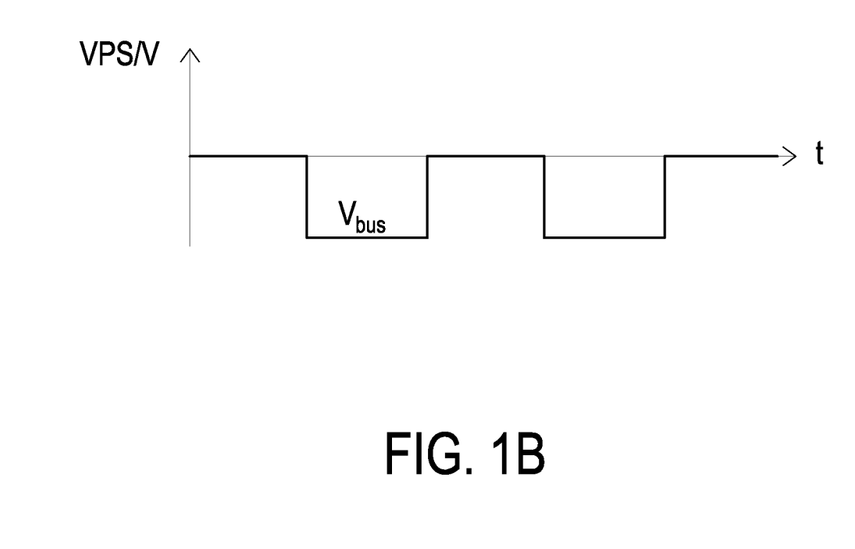
FIG. 1B is a schematic diagram showing the working voltage between the primary and secondary grounds of the post-stage isolated converter in FIG. 1A.

FIG. 1A is a schematic diagram showing a manner of measuring a working voltage between the primary and secondary grounds of a post-stage isolated converter connected to a PFC converter. As shown in FIG. 1A, a PFC converter 1 is connected to a post-stage isolated converter 2 through a bus capacitor C. When a working voltage between the primary and secondary grounds of the post-stage isolated converter 2 is measured, the primary wires N and PE and the secondary ground wire Sec-GND have to be shorted (the path of short circuit is depicted by arrows). FIG. 1B is a schematic diagram showing the working voltage between the primary and secondary grounds of the post-stage isolated converter 2 in FIG. 1A. The working voltage between the primary and secondary grounds equals the effective value of the voltage VPS between the primary and secondary grounds, namely equals $V_{bus}/\sqrt{2}$. Generally, the voltage Vbus on the bus capacitor C is about 400V, and thus working voltage between the primary and secondary grounds is calculated to be about 283V(rms). In medical applications, it is required to satisfy IEC-60601. According to the requirements for the creepage distance and air clearance in IEC-60601, the optoelectronic isolator between the primary and secondary grounds of the post-stage isolated converter 2 has to provide a creepage distance not smaller than 12 mm when the working voltage between the primary and secondary grounds is larger than 250V(rms). Therefore, the general optoelectronic isolator that provides the creepage distance of 8 mm cannot be used, and the volume and cost of the isolation components between the primary and secondary grounds of the post-stage isolated converter 2 are both increased.

Wherein, the voltage between the primary and secondary grounds of the post-stage isolated converter 2 is corresponding to the voltage on a middle node of a line frequency bridge of the PFC converter 1. The working voltage between the primary and secondary grounds of the post-stage isolated converter 2 can be decreased by reducing the effective value of the voltage on the middle node of the line frequency bridge of the PFC converter 1. In specific, through controlling a ratio of the high level duration on the middle node of the line frequency bridge of the PFC converter 1 in every line frequency cycle to be smaller than a threshold value, the effective value of the voltage on the middle node of the line frequency bridge of the PFC converter 1 can be reduced. Accordingly, the working voltage between the primary and secondary grounds of the post-stage isolated converter 2 is reduced, for example, to be smaller than 250V.

Figure 2A:
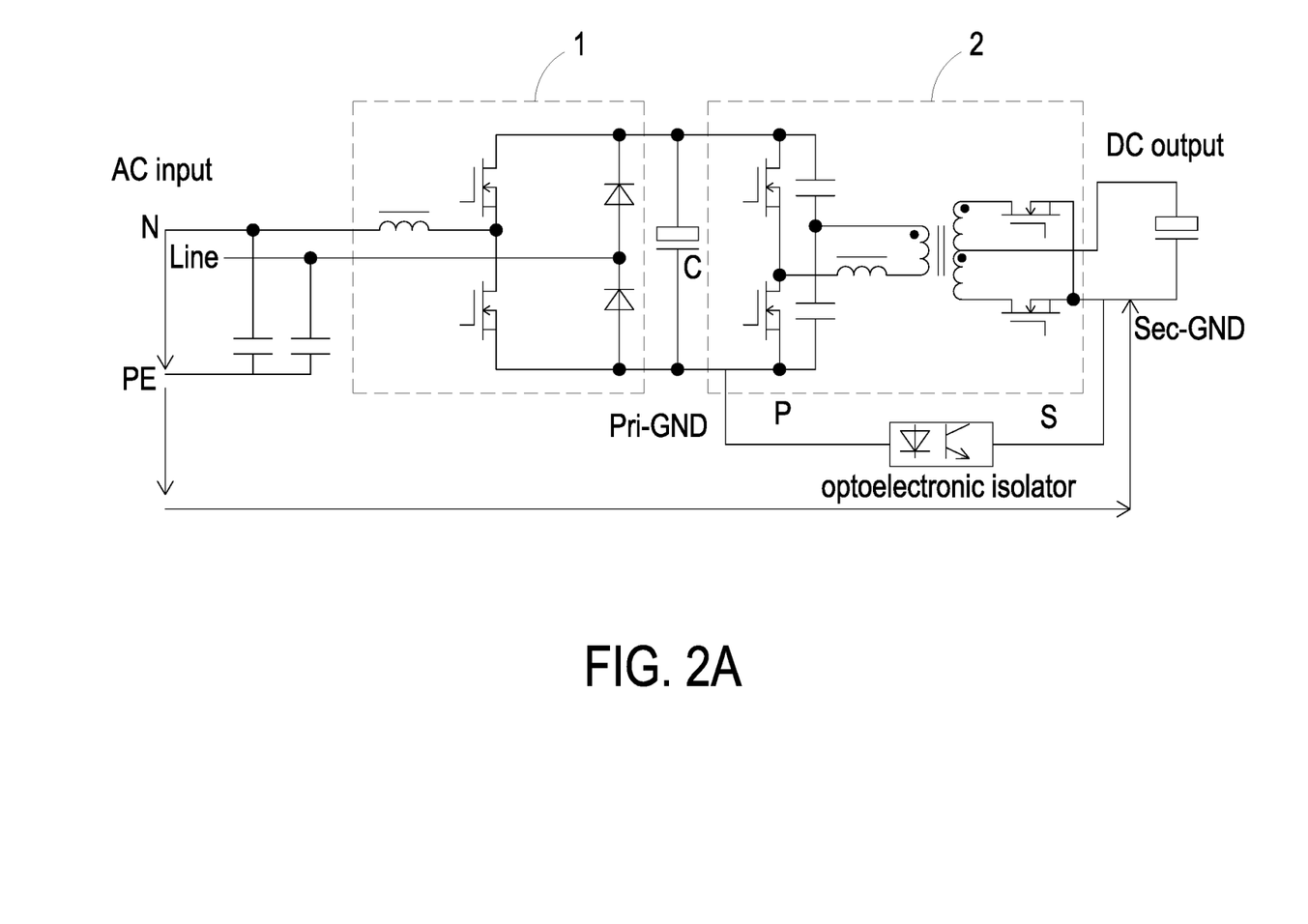
FIG. 2A is a schematic diagram showing another manner of measuring a working voltage between the primary and secondary grounds of a post-stage isolated converter connected to a PFC converter.
Figure 2B:
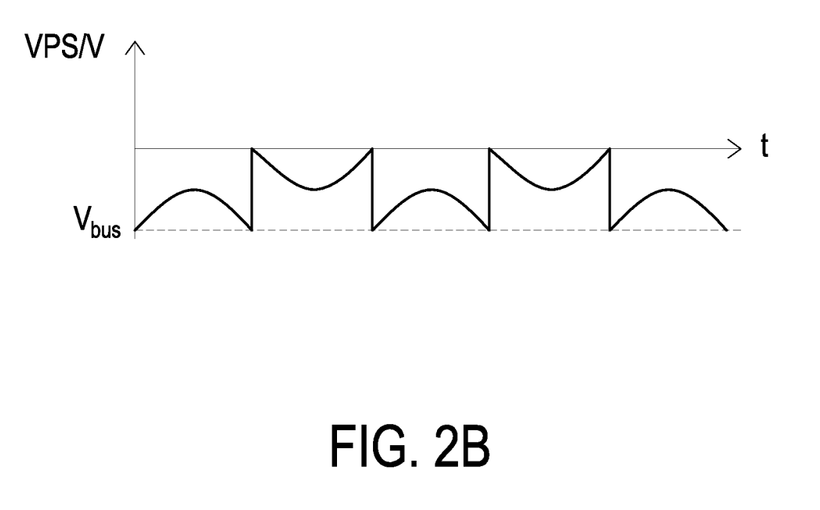
FIG. 2B is a schematic diagram showing the working voltage between the primary and secondary grounds of the post-stage isolated converter in FIG. 2A.

In another embodiment, the connection between AC power source and PFC converter depicted in FIG. 1A may be changed. As shown in FIG. 2A, in this embodiment, when a working voltage between the primary and secondary grounds of the post-stage isolated converter 2 is measured, the primary wires N and PE and the secondary ground wire Sec-GND are shorted. FIG. 2B shows the working voltage between the primary and secondary grounds of the post-stage isolated converter 2 in FIG. 2A. Comparing FIG. 2B with FIG. 1B, although the waveforms are different, the effective values of the voltage VPS are the same.

Figure 3:
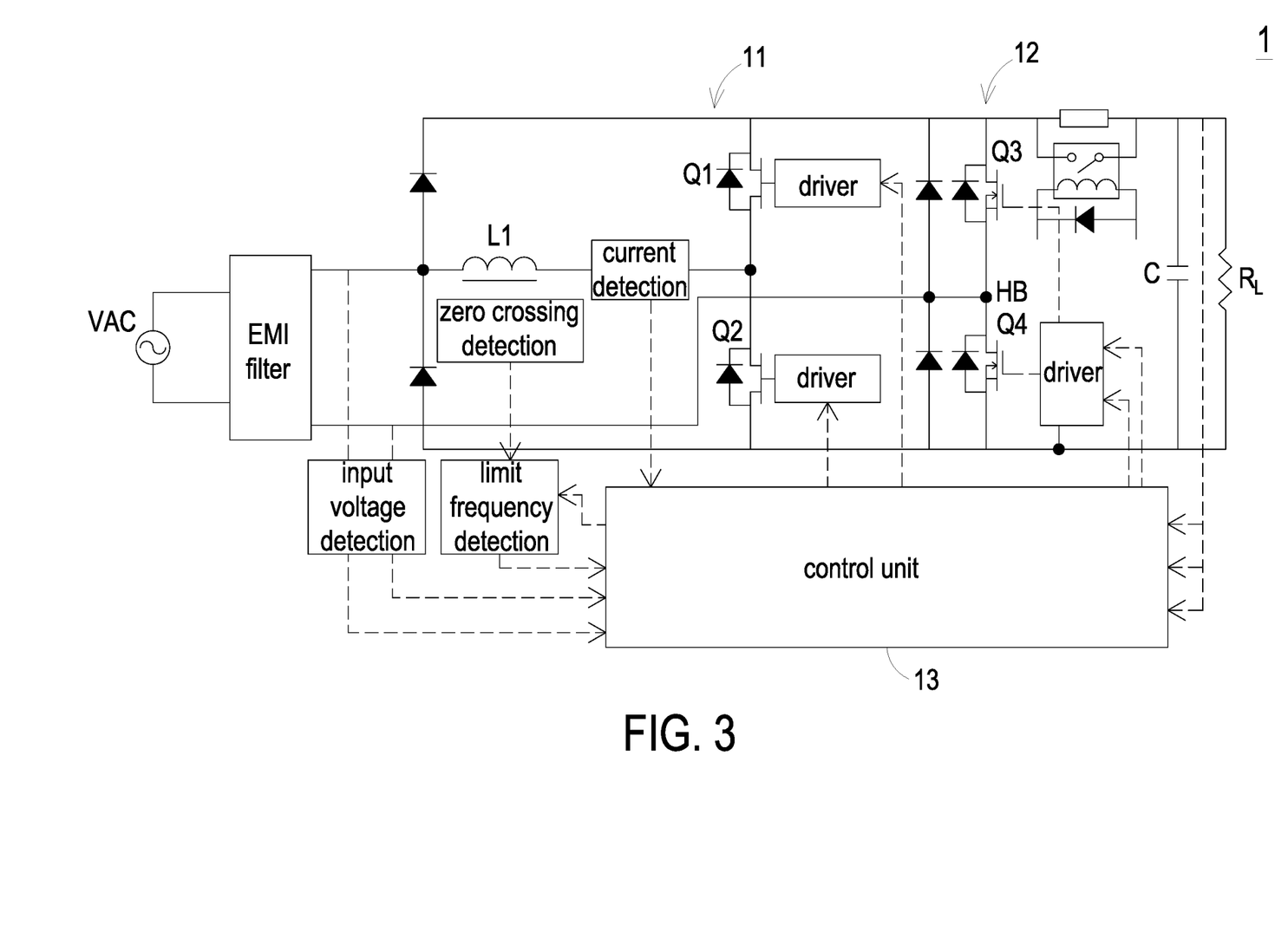
FIG. 3 is a schematic circuit diagram illustrating a PFC converter according to an embodiment of the present disclosure.

FIG. 3 is a schematic circuit diagram illustrating a PFC converter according to an embodiment of the present disclosure. As shown in FIG. 3, the PFC converter 1 includes a first bridge 11, an inductor L1, a second bridge 12 and a control unit 13, and the PFC converter 1 is a totem pole PFC converter. The first bridge 11 (i.e., the high frequency bridge) includes a first switch Q1 and a second switch Q2 connected to each other in series. The first switch Q1 and the second switch Q2 are connected to a first node therebetween. Two terminals of the inductor L1 are coupled to the first node and a first terminal of an AC power source VAC respectively. The second bridge 12 (i.e., the line frequency bridge) includes a third switch Q3 and a fourth switch Q4 connected to each other in series. The third switch Q3 and the fourth switch Q4 are connected to a second node HB therebetween, and the second node HB is coupled to a second terminal of the AC power source VAC. The first switch Q1, the second switch Q2, the third switch Q3 and the fourth Q4 are for example but not limited to IGBTs (insulated gate bipolar transistors), MOSFETs (metal-oxide-semiconductor field-effect transistor), GaN transistors or SiC transistors. The control unit 13 controls a ratio of the high level duration on the second node HB in every line frequency cycle to be smaller than a threshold value equal to $(250/Vbus)^2$, where Vbus is an output voltage of the PFC converter 1. In an embodiment, the output voltage Vbus of the PFC converter may be 400V, but not limited thereto. Wherein, the voltage between the primary and secondary grounds of the post-stage converter connected to the PFC converter 1 is equivalent to the voltage on the second node HB. Further, since the present disclosure focuses on reducing the ratio of the high level duration on the second node HB for reducing the distance between the primary and secondary grounds of the post-stage converter, the post-stage converter is not shown in the FIG. 3 of the present disclosure. According to the above descriptions, the present disclosure controls the ratio of the high level duration on the second node HB in every line frequency cycle to be smaller than the threshold value, so as to reduce the effective value of the voltage on the second node HB. Accordingly, the working voltage between the primary and secondary grounds is reduced, and the distance between the primary and secondary grounds of the post-stage converter is reduced as well. Consequently, the volume of the optoelectronic isolator between the primary and secondary grounds is reduced, and also the cost is reduced.

In an embodiment, the control unit 13 may be a digital controller or an analog chip controller, and the controller unit 13 can be utilized to perform all kinds of detection and control calculation and to provide switch driving signal. As shown in FIG. 3, for example, the control unit 13 provides driving signals to the drivers for all the switches so as to control the operations of the first switch Q1, the second switch Q2, the third switch Q3 and the fourth switch Q4 respectively. In addition, the control unit 13 can perform the input voltage detection, the zero crossing detection, the limit frequency detection, the inductor current detection and/or the output voltage detection. The user is allowed to adjust the functions of the control unit 13, and the functions of the control unit 13 are not limited thereto.

Figure 4:
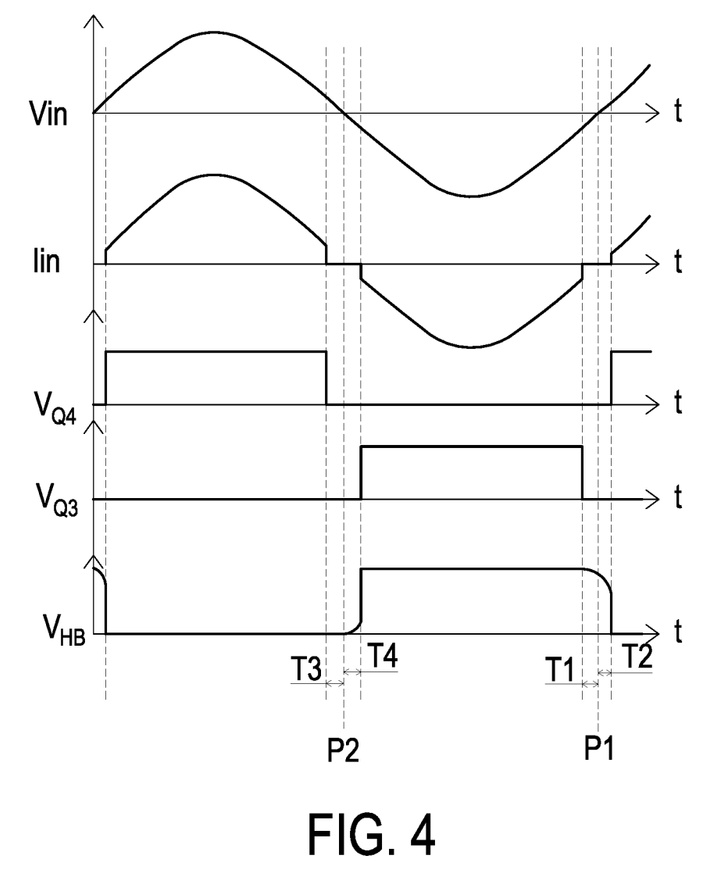
FIG. 4 is a schematic diagram of normal operation waveforms of the PFC converter according to an embodiment of the present disclosure.

The work waveforms in the PFC converter 1 are shown in FIG. 4. In FIG. 4, Vin represents the input voltage received by the PFC converter 1 from the AC power source VAC, Iin represents the input current of the PFC converter 1, $V_{Q3}$ and $V_{Q4}$ represent the driving signals of the third switch Q3 and the fourth switch Q4 respectively, and $V_{HB}$ represents the voltage on the second node HB. The third switch Q3 is turned on substantially during the negative half cycle of the AC power source VAC, and the fourth switch Q4 is turned on substantially during the positive half cycle of the AC power source VAC. There is a first zero-crossing point P1 when the input voltage Vin varies from negative to positive. During a first time period T1 before the first zero-crossing point P1, the input current Iin equals zero. Also, during a second time period T2 after the first zero-crossing point P1, the input current Iin equals zero. In addition, during the first time period T1 and the second time period T2, the third switch Q3 and the fourth switch Q4 are both turned off.

There is a second zero-crossing point P2 when the input voltage Vin varies from positive to negative. During a third time period T3 before the second zero-crossing point P2, the input current Iin equals zero. Also, during a fourth time period T4 after the second zero-crossing point P2, the input current Iin equals zero. In addition, during the third time period T3 and the fourth time period T4, the third switch Q3 and the fourth switch Q4 are both turned off.

As shown in FIG. 4, when the third switch Q3 is turned off, the voltage $V_{HB}$ will not change to low level from high level immediately, and it will take some time to change, so the ratio of the high level duration on the second node HB in every line frequency cycle is about 0.5. In order to decrease the working voltage between the primary and secondary grounds of the post-stage isolated converter, the ratio of the high level duration on the second node HB in every line frequency cycle is controlled to be smaller than the threshold value. In other words, as the ratio of the high level duration on the second node HB is reduced, the working voltage between the primary and secondary grounds of the post-stage isolated converter is decreased. Various possible implementations of control method are exemplified as follows.

Figure 5:
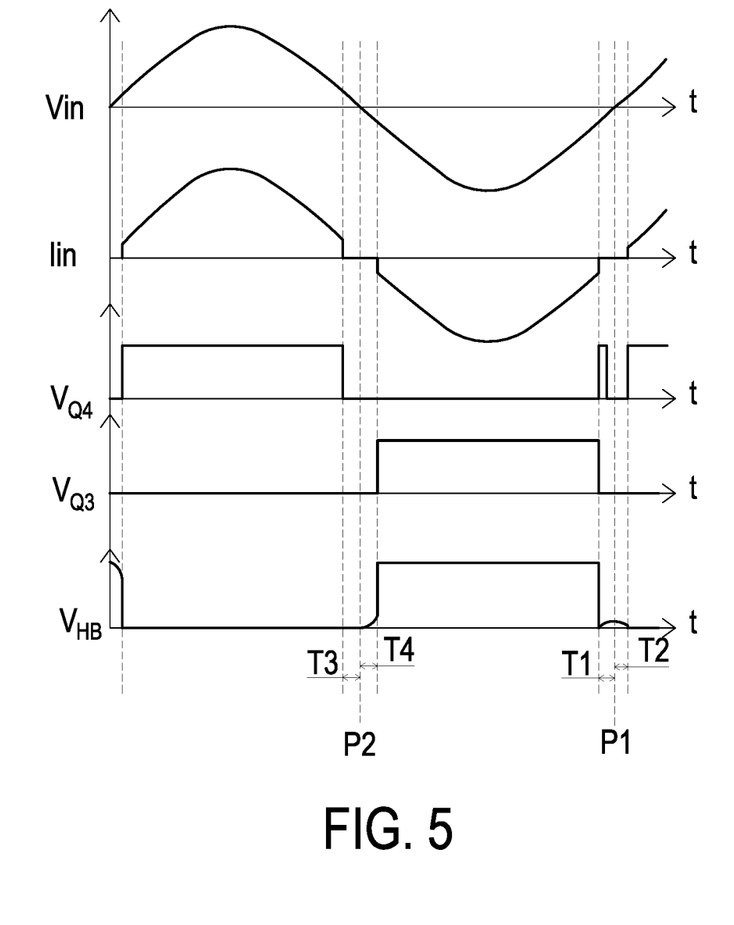
FIG. 5, FIG. 6 and FIG. 7 are schematic diagrams of the PFC converter controlled by various control methods according to various embodiments of the present disclosure respectively.
Figure 6:
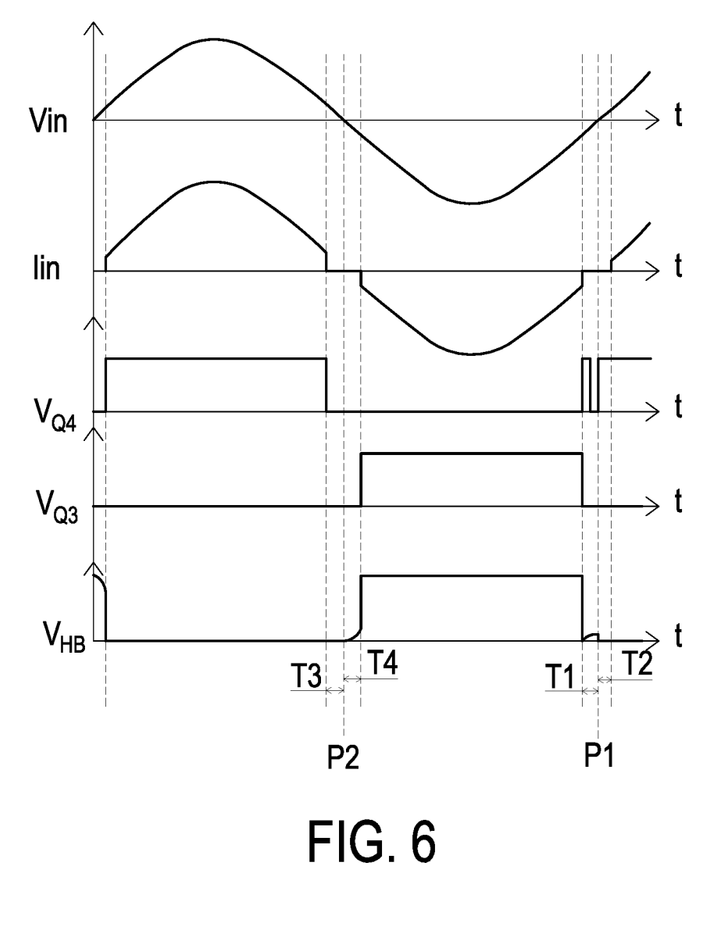

In an embodiment, as shown in FIG. 5, the control unit 13 controls the fourth switch Q4 to be turned on for a preset time from the beginning of the first time period T1. Since the voltage $V_{HB}$ on the second node HB changes to low level as the fourth switch Q4 is turned on, the ratio of the high level duration on the second node HB can be reduced. The preset time is shorter than the first time period T1. In an embodiment, the preset time of the fourth switch Q4 being turned on is very short, and the voltage on the second node HB can be changed to low level by a short driving pulse for the fourth switch Q4. In an embodiment, the preset time may be 10 us~50 us, but not limited thereto. In an embodiment, as shown in FIG. 6, the control unit 13 further controls the fourth switch Q4 to be on during the second time period T2, so as to reduce the ratio of the high level duration on the second node HB.

In an embodiment, the range of the first time period T1, the second time period T2, the third time period T3 and the fourth time period T4 is for example but not limited to be between 0.7~1.8 ms.

Figure 7:
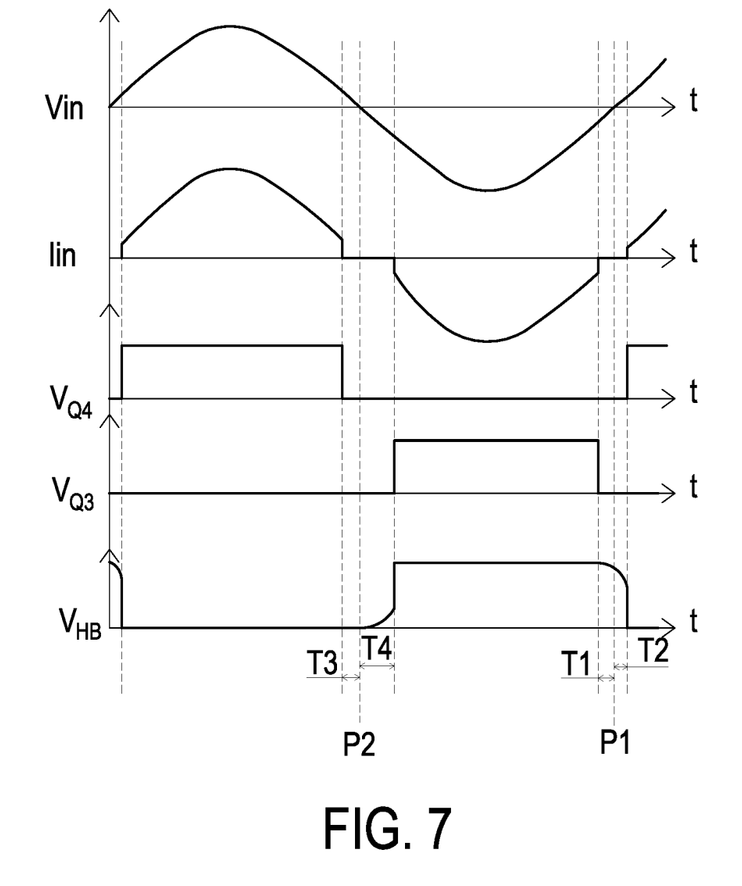

In an embodiment, as shown in FIG. 7, the control unit 13 controls to extend the fourth time period T4. Since the voltage $V_{HB}$ on the second node HB varies to high level from low level when the fourth time period T4 is end, the control unit 13 can reduce the ratio of the high level duration on the second node HB by extending the fourth time period T4 (i.e., by delaying the timing of turning on the third switch Q3).

Figure 8:
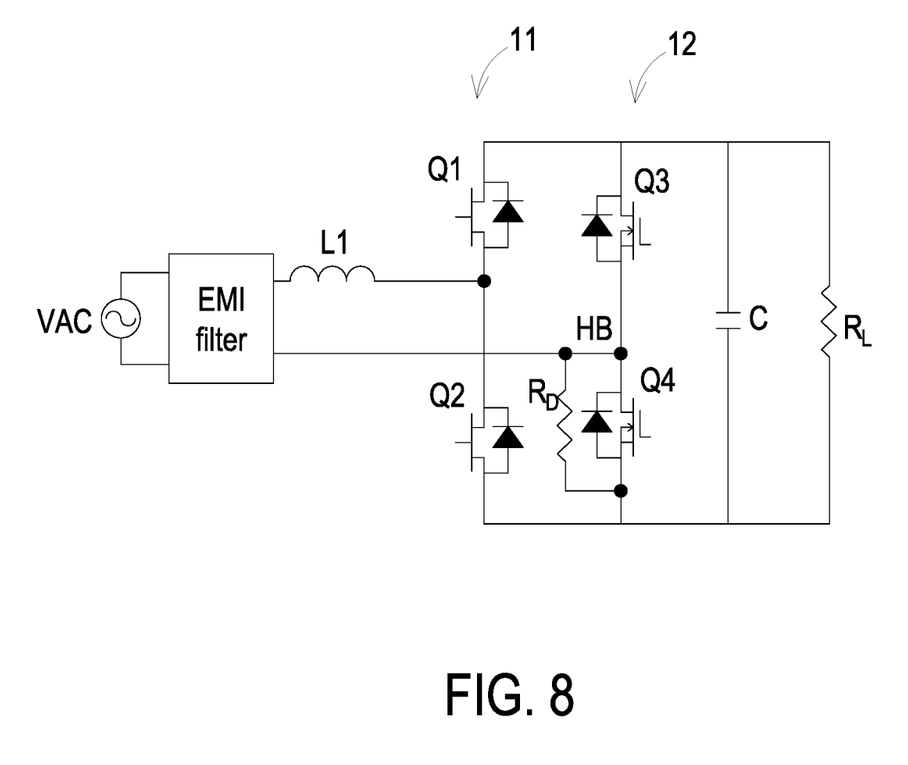
FIG. 8 schematically shows a variant of the PFC converter of the present disclosure.

In addition to the above control methods, in an embodiment, as shown in FIG. 8, the ratio of the high level duration on the second node HB is reduced through connecting a resistor $R_D$ to two terminals (for example, a drain terminal and a source terminal) of the fourth switch Q4 in parallel. Wherein, as the resistor $R_D$ is connected to the two terminals of the fourth switch Q4 in parallel, the speed of discharging at the second node is speeded up after the third switch Q3 is turned off. Namely, the speed of the voltage $V_{HB}$ on the second node HB varying from high level to low level becomes faster. Consequently, the ratio of the high level duration on the second node HB is reduced.

From the above descriptions, the present disclosure provides a PFC converter and a control method thereof. On the middle node of the line frequency bridge, a ratio of the high level duration in every line frequency cycle is controlled to be smaller than a threshold value, thereby decreasing the working voltage between primary and secondary grounds of the post-stage converter connected to the PFC converter. Accordingly, the distance between the primary and secondary grounds of the post-stage converter is reduced. Consequently, the volume of the optoelectronic isolator between the primary and secondary grounds can be reduced, which also decreases the cost.

While the disclosure has been described in terms of what is presently considered to be the most practical and preferred embodiments, it is to be understood that the disclosure needs not be limited to the disclosed embodiment.

What is claimed is:

1. A PFC converter, comprising:
   a first bridge comprising a first switch and a second switch connected to each other in series, wherein there is a first node between the first and second switches;
   an inductor, wherein two terminals of the inductor are coupled to the first node and a first terminal of an AC power source respectively;
   a second bridge comprising a third switch and a fourth switch connected to each other in series, wherein there is a second node between the third and fourth switches, and the second node is coupled to a second terminal of the AC power source; and
   a control unit configured to control a ratio of a high level duration on the second node in every line frequency cycle to be smaller than a threshold value equal to $(250/Vbus)^2$, where Vbus is an output voltage of the PFC converter.

2. The PFC converter according to claim 1, wherein the PFC converter receives an input voltage from the AC power source, there is a first zero-crossing point when the input voltage varies from negative to positive, and an input current of the PFC converter equals zero during a first time period before the first zero-crossing point and a second time period after the first zero-crossing point.

3. The PFC converter according to claim 2, wherein the control unit controls the fourth switch to be turned on for a preset time from the beginning of the first time period so as to reduce the ratio of the high level duration on the second node, and the preset time is shorter than the first time period.

4. The PFC converter according to claim 3, wherein the control unit controls the fourth switch to be on during the second time period so as to reduce the ratio of the high level duration on the second node.

5. The PFC converter according to claim 2, wherein a range of the first time period and the second time period is between 0.7~1.8 ms.

6. The PFC converter according to claim 1, wherein the PFC converter receives an input voltage from the AC power source, there is a second zero-crossing point when the input voltage varies from positive to negative, and an input current of the PFC converter equals zero during a third time period before the second zero-crossing point and a fourth time period after the second zero-crossing point.

7. The PFC converter according to claim 6, wherein the control unit reduces the ratio of the high level duration on the second node by extending the fourth time period.

8. The PFC converter according to claim 6, wherein a range of the third time period and the fourth time period is between 0.7~1.8 ms.

9. The PFC converter according to claim 1, further comprising a resistor connected to two terminals of the fourth switch in parallel, wherein the resistor is configured to reduce the ratio of the high level duration on the second node.

10. The PFC converter according to claim 1, wherein the first switch, the second switch, the third switch and the fourth switch are IGBTs, MOSFETs, GaN transistors or SiC transistors.

11. The PFC converter according to claim 1, wherein the output voltage of the PFC converter is 400V.

12. A control method of a PFC converter, wherein the PFC converter comprises a first bridge, a second bridge and an inductor, the first bridge comprises a first switch and a second switch connected to each other in series, there is a first node between the first and second switches, two terminals of the inductor are coupled to the first node and a first terminal of an AC power source respectively, the second bridge comprises a third switch and a fourth switch connected to each other in series, there is a second node between the third and fourth switches, the second node is coupled to a second terminal of the AC power source, and the control method comprises:

controlling a ratio of a high level duration on the second node in every line frequency cycle to be smaller than a threshold value equal to $(250/Vbus)^2$, where Vbus is an output voltage of the PFC converter.

13. The control method according to claim 12, wherein the PFC converter receives an input voltage from the AC power source, there is a first zero-crossing point when the input voltage varies from negative to positive, and an input current of the PFC converter equals zero during a first time period before the first zero-crossing point and a second time period after the first zero-crossing point.

14. The control method according to claim 13, further comprising: controlling the fourth switch to be turned on for a preset time from the beginning of the first time period so as to reduce the ratio of the high level duration on the second node, wherein the preset time is shorter than the first time period.

15. The control method according to claim 14, further comprising: controlling the fourth switch to be on during the second time period so as to reduce the ratio of the high level duration on the second node.

16. The control method according to claim 12, wherein the PFC converter receives an input voltage from the AC power source, there is a second zero-crossing point when the input voltage varies from positive to negative, and an input current of the PFC converter equals zero during a third time period before the second zero-crossing point and a fourth time period after the second zero-crossing point.

17. The control method according to claim 16, further comprising: extending the fourth time period so as to reduce the ratio of the high level duration on the second node.

18. The control method according to claim 12, wherein the output voltage of the PFC converter is 400V.

19. The control method according to claim 12, further comprising: disposing a resistor connected to two terminals of the fourth switch in parallel.

* * * * *